(12) United States Patent
Plant et al.

(10) Patent No.: US 11,500,950 B2
(45) Date of Patent: Nov. 15, 2022

(54) DIGITAL SEARCH RESULTS GENERATION

(71) Applicant: INTERNATIONAL BUSINESS MACHINES CORPORATION, Armonk, NY (US)

(72) Inventors: Laurence James Plant, North Balwyn (AU); Christopher James Poynter, Wheelers Hill (AU)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 17/089,941

(22) Filed: Nov. 5, 2020

(65) Prior Publication Data

US 2022/0138275 A1    May 5, 2022

(51) Int. Cl.
*G06F 16/9535* (2019.01)
*G06F 16/9538* (2019.01)
(Continued)

(52) U.S. Cl.
CPC ........ *G06F 16/9535* (2019.01); *G06F 3/0482* (2013.01); *G06F 16/24578* (2019.01);
(Continued)

(58) Field of Classification Search
CPC .............. G06F 16/9535; G06F 3/0482; G06F 16/24578; G06F 16/9538; G06Q 30/0627; G06Q 50/01; G06Q 30/02; G06N 5/04
(Continued)

(56) References Cited

U.S. PATENT DOCUMENTS 9,817,625 B1 * 11/2017 Chun ................... G06F 16/5866
10,521,833 B2    12/2019 Kumar
(Continued)

FOREIGN PATENT DOCUMENTS

| AU | 2019101626 A4 | 1/2020 | |
| EP | 2079046 A1 * | 7/2009 | ............. G06Q 30/02 |
| WO | WO-2012112272 A2 * | 8/2012 | ............. G06Q 10/10 |

OTHER PUBLICATIONS

Anonymous; Dynamically Determine and Present Relevant Media While Presenting the Product; IP.com; IPCOM00026076D; Dec. 19, 2019; 4 pages.
(Continued)

*Primary Examiner* — Ashish Thomas
*Assistant Examiner* — Abdullah A Daud
(74) *Attorney, Agent, or Firm* — Schmeiser, Olsen & Watts, LLP; Aaron Pontikos (57) ABSTRACT

A method, system, and computer program product for enabling a digital search is provided. The method includes monitoring, in response to receiving authorization from a user, Web search results of a user, social media accounts, and media sources. In response data indicating an importance of world related factors with respect to the user is received. The data is analyzed with respect to results of the monitoring and an associated metadata model and modeling software application is generated. A search request associated with initiating a Web search for a product or service is initiated and the modeling software application is executed with respect to the metadata model and Web search. Personalized Web search results are generated and presented to the user. The personalized Web search results indicate entities associated with providing the product or service for the user via Internet based commerce Websites.

20 Claims, 8 Drawing Sheets

(51) Int. Cl.
    *G06F 16/2457* (2019.01)
    *G06F 3/0482* (2013.01)
    *G06Q 30/06* (2012.01)
    *G06Q 50/00* (2012.01)

(52) U.S. Cl.
    CPC ..... *G06F 16/9538* (2019.01); *G06Q 30/0627* (2013.01); *G06Q 50/01* (2013.01)

(58) Field of Classification Search
    USPC .......................................................... 707/734
    See application file for complete search history.

(56) References Cited

U.S. PATENT DOCUMENTS

| | | |
|---|---|---|
| 10,672,042 B2 | 6/2020 | Bostick |
| 2010/0228715 A1* | 9/2010 | Lawrence ............... G06F 16/93 707/706 |
| 2013/0018751 A1* | 1/2013 | Winslade ............... G06Q 30/02 705/26.2 |
| 2013/0282713 A1* | 10/2013 | Lawrence ......... G06F 16/24578 707/732 |
| 2015/0081695 A1* | 3/2015 | Schillings ........... G06F 16/9535 707/736 |
| 2018/0365327 A1* | 12/2018 | Li ....................... G06F 16/9535 |
| 2019/0172575 A1* | 6/2019 | Reddy ................ G09B 19/0092 |
| 2020/0279289 A1* | 9/2020 | Naphade .............. H04N 21/812 |
| 2021/0142097 A1* | 5/2021 | Zheng .................. G06V 10/255 |
| 2021/0241155 A1* | 8/2021 | Kardan .................. G06Q 50/01 |

OTHER PUBLICATIONS

Shop ethical! app; https://www.ethical.org.au/3.4.2/get-involved/resources/shop-ethical-app/; retrieved from the Internet Jul. 15, 2020; 3 pages.

Personal Shopping Assistant; Google Play; https://play.google.com/store/apps/details?id=com.microsoft.psa&hl=en_AU; retrieved from the Internet Jul. 15, 2020; 3 pages.

Mell, Peter et al.; "The NIST Definition of Cloud Computing;" National Institute of Standards and Technology; Special Publication 800-145; Sep. 2011; 7 pages.

Matussek, Karin et al.; Fiat Chrysler and Iveco offices raided in "dieselgate" Investigation; The Age; Jul. 23, 2020; 2 pages.

* cited by examiner

DIGITAL SEARCH RESULTS GENERATION

BACKGROUND

The present invention relates generally to a method for generating personalized digital search results and in particular to a method and associated system for improving network search technology associated with monitoring Web sources, determining an importance of world related factors with respect to a user, and generating personalized Web search results for the user based on the determined importance of world related factors of the user.

SUMMARY

A first aspect of the invention provides a digital search method comprising: receiving, by a processor of a server hardware device from a user, data indicating an importance of world related factors with respect to the user; analyzing, by the processor, the data with respect to: Web search results associated with multiple Web searches initiated by the user, social media accounts of the user, and media sources; generating, by the processor based on results of the analyzing, a metadata model and a modeling software application personalized for the user; receiving, by the processor from the user, a search request associated with initiating a specified Web search for a specified product or service; executing, by the processor in response to receiving the search request, the modeling software application with respect to the metadata model and the specified Web search; generating, by the processor in response to results of the executing, personalized Web search results for the user, wherein the personalized Web search results indicate multiple entities associated with providing the specified product or service for the user via Internet based commerce Websites; and presenting, by the processor to the user via a user interface, the personalized Web search results.

A second aspect of the invention provides a computer program product, comprising a computer readable hardware storage device storing a computer readable program code, the computer readable program code comprising an algorithm that when executed by a processor of a server hardware device implements a digital search method, the method comprising: receiving, by the processor from a user, data indicating an importance of world related factors with respect to the user; analyzing, by the processor, the data with respect to: Web search results associated with multiple Web searches initiated by the user, social media accounts of the user, and media sources; generating, by the processor based on results of the analyzing, a metadata model and a modeling software application personalized for the user; receiving, by the processor from the user, a search request associated with initiating a specified Web search for a specified product or service; executing, by the processor in response to receiving the search request, the modeling software application with respect to the metadata model and the specified Web search; generating, by the processor in response to results of the executing, personalized Web search results for the user, wherein the personalized Web search results indicate multiple entities associated with providing the specified product or service for the user via Internet based commerce Websites; and presenting, by the processor to the user via a user interface, the personalized Web search results.

A third aspect of the invention provides a server hardware device comprising a processor coupled to a computer-readable memory unit, the memory unit comprising instructions that when executed by the processor implements a digital search method comprising: receiving, by the processor from a user, data indicating an importance of world related factors with respect to the user; analyzing, by the processor, the data with respect to: Web search results associated with multiple Web searches initiated by the user, social media accounts of the user, and media sources; analyzing, by the processor, the data with respect to results of: the monitoring the Web search results, the monitoring the social media accounts and the monitoring the media sources; generating, by the processor based on results of the analyzing, a metadata model and a modeling software application personalized for the user; receiving, by the processor from the user, a search request associated with initiating a specified Web search for a specified product or service; executing, by the processor in response to receiving the search request, the modeling software application with respect to the metadata model and the specified Web search; generating, by the processor in response to results of the executing, personalized Web search results for the user, wherein the personalized Web search results indicate multiple entities associated with providing the specified product or service for the user via Internet based commerce Websites; and presenting, by the processor to the user via a user interface, the personalized Web search results.

The present invention advantageously provides a simple method and associated system capable of accurately generating personalized digital search results.

DETAILED DESCRIPTION

Figure 1:
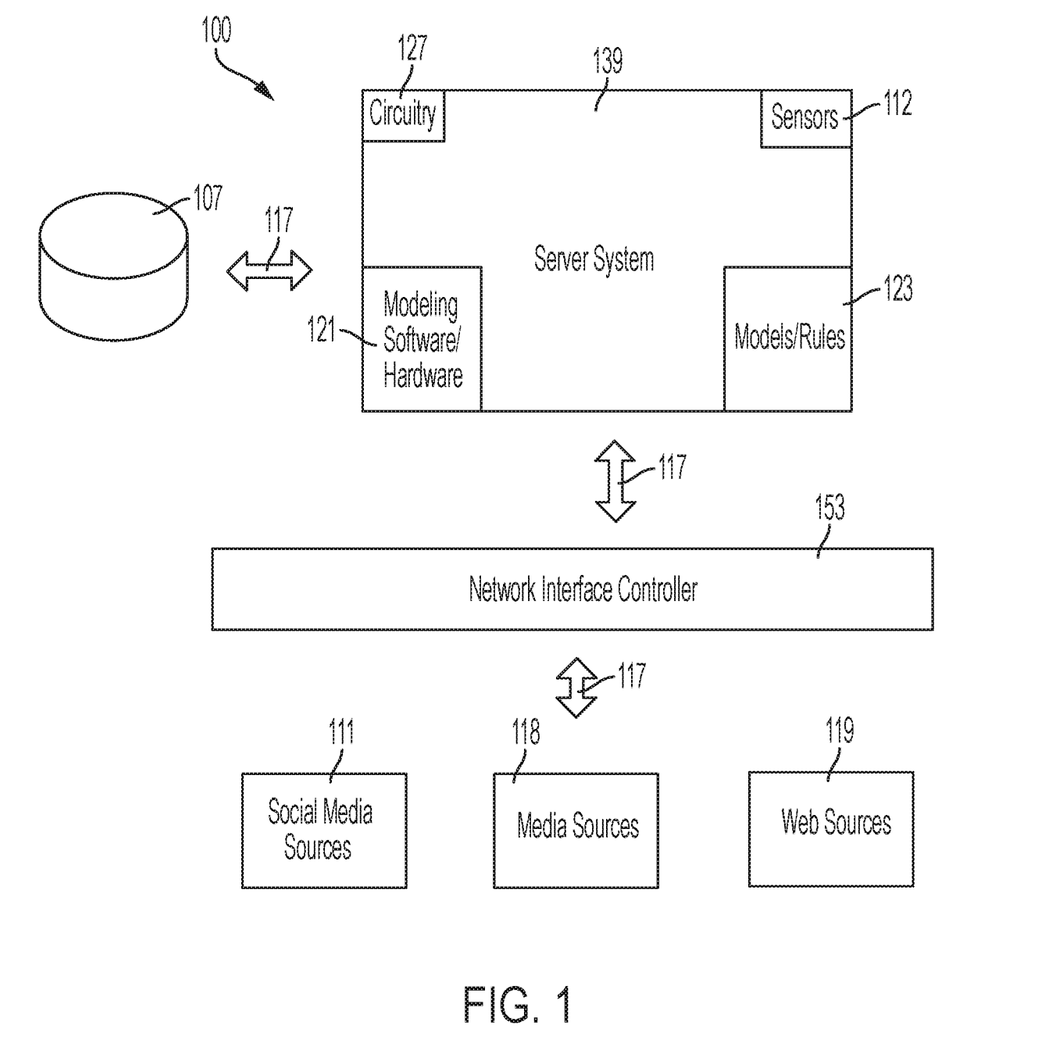
FIG. 1 illustrates a system for improving network search technology associated with monitoring Web sources, determining an importance of world related factors with respect to a user, and generating personalized Web search results for the user based on the determined importance of world related factors of the user, in accordance with embodiments of the present invention.

FIG. 1 illustrates a system 100 for improving network search technology associated with monitoring Web sources, determining an importance of world related factors with respect to a user, and generating personalized Web search results for the user based on the determined importance of world related factors of the user, in accordance with embodiments of the present invention. Users attempting to locate various items may associate purchase decisions with external (world related) factors such as, inter alia, type and location-based sourcing (e.g., geographic locations, for profit or non-profit companies, etc.), carbon footprint issues during manufacturing of products (e.g., associated with manufacturing, transportation, farming practices, recycling practices, labor practices, sourcing supply chains, etc.), socialization alignment (e.g., social media issues, product review sources, community based issues, etc.), etc. Information associated with the external factors may not be available to the user during a typical purchasing process. Therefore, the information may be stored as metadata associated with an item selected by a user such that the metadata may enable a presentation describing the factors for the user. Likewise, it may be difficult to determine which external factors may be valued by individual users and associated communities within different parts of the world. Therefore, the information associated with the external factors may be of significant value to merchants, advertisers, and manufacturers seeking to improve a product or service and/or a perception of the product or service thereby enhancing a brand. For example, carbon footprint issues (e.g., concerns about environmental sustainability) may enter community consciousness with respect to manufacturing of products for purchase and therefore the aforementioned issues may be associated with metadata for presentation to potential purchasers of the product or service. Therefore, system 100 enables a process for providing assistance for a shopper of a product/service based on specific factors/information such as, review, feedback, and/or complaint of the product/service.

System 100 is configured to enable the following process for configuring Web search services for determining external factors that may be of significant value to merchants, advertisers, and manufacturers:
1. Monitoring and analyzing product/service information sought by a user based on information (i.e., associated with one or more external factors) searched and reviewed on a webpage.
2. Aggregating and building a profile of comprising external factors that appear important to a user.
3. Automatically fetching and displaying metadata of a product/service relevant to the external factors for the user.
4. Presenting personalized results (comprising external factors) to the user to enable purchase decisions associated with external factors emerging and evolving over a period.

System 100 of FIG. 1 includes a server system 139 (i.e., specialized hardware device), a network interface controller 153, social media sources 111, media sources 118, Web sources 119, and a database 107 (e.g., a cloud-based system) interconnected through a network 117. Server system 139 includes specialized circuitry 127 (that may include specialized software), sensors 112, models/rules 123, and modeling software code/hardware 121 (i.e., including machine learning software code). Interface controller 153 may include any type of device or apparatus for securely interfacing hardware and software to a network. Sensors 112 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Social media sources 111 may comprise any type of social media Websites and/or Internet Websites. Media sources 118 may comprise any type of media (e.g., news based) Websites and/or Internet Websites. Web sources 119 may comprise any type of Websites and/or Internet Websites (e.g., associated with consumer reviews, community forums, industry reports, court cases, etc.). Server system 139 may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server system 139 may comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving network search technology associated with monitoring Web sources, determining an importance of world related factors with respect to a user, and generating personalized Web search results for the user based on the determined importance of world related factors of the user. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following functionality:
1. Determining changing and divergent consumer preferences.
2. Generating an interface for users to modify search results filtering according to preference with respect to products and services marketed by retailers (or wholesale manufacturers).
3. Generating products and services metadata to present digital commerce experience differentiation to consumers.
4. Packaging profile interests as selectable digital collections that may be extended for personal uniqueness and training reinforced for specific nuances.
5. Generating open source collaboration of communities extensible for shared and emerging filtering interests.

Figure 2:
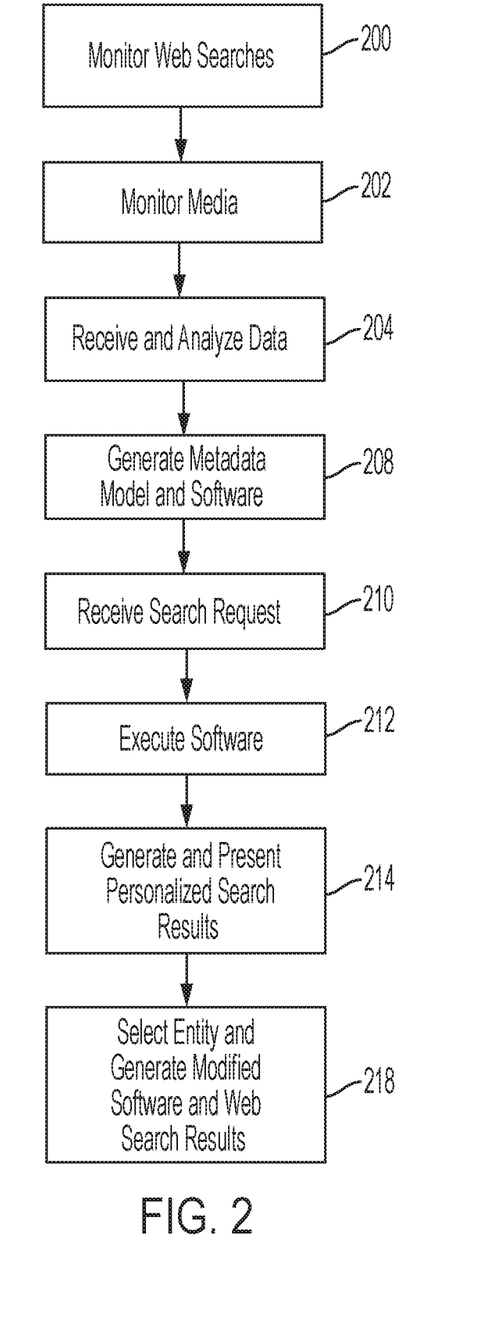
FIG. 2 illustrates an algorithm detailing a process flow enabled by the system of FIG. 1 for improving network search technology associated with monitoring Web sources, determining an importance of world related factors with respect to a user, and generating personalized Web search results for the user based on the determined importance of world related factors of the user, in accordance with embodiments of the present invention.

FIG. 2 illustrates an algorithm detailing a process flow enabled by system 100 of FIG. 1 for improving network search technology associated with monitoring Web sources, determining an importance of world related factors with respect to a user, and generating personalized Web search results for the user based on the determined importance of world related factors of the user, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed by server system 139 of FIG. 1. In step 200, Web search results associated with multiple Web searches initiated by a user are monitored in response to receiving authorization from the user. In step 202, social media accounts (of the user) and media sources are monitored in response to receiving authorization from the user. In step 204, data indicating an importance of world related factors with respect to the user is received and analyzed with respect to results of the monitoring processes of steps 200 and 202. The world related factors may include, inter alia, social factors, environmental factors, physical factors, etc. Additionally, an area surrounding the user may be monitored via sensors in response to receiving authorization from the user. The data may be analyzed by analyzing results of monitoring the area surrounding the user with respect to the data. The sensors comprise, inter alia, a video retrieval device, an optical sensor, an audio retrieval device, etc.

In step 208, a metadata model and a modeling software application (personalized for the user) is generated based on the analysis of step 204. In step 210, a search request associated with initiating a specified Web search for a specified product is received by a user. The specified product may comprise an item, a service, a manufacturer, a merchant, etc.

In step 212, the modeling software application is executed (in response to receiving the search request) with respect to the metadata model and the specified Web search. In step 214, personalized Web search results are generated and presented to the user in response to step 212. The personalized Web search results indicate multiple entities associated with providing the specified product or service for the user via Internet based commerce Websites. The personalized Web search results are presented to the user via a user interface. Generating the personalized Web search results comprises ranking the entities in accordance with a determined importance level of the user with respect to the importance of the world related factors with respect to the user. Presenting the personalized Web search results to the user causes the user to select an entity and initiate a Web retrieval process for securing the specified product or service. Additionally, the personalized Web search results may be further generated based on emerging, growing, or shrinking factors of interest with respect to differing user demographics. The merging, growing, or shrinking factors of interest may be generated by:
1. Retrieving metadata models associated with a plurality of users.
2. Aggregating the metadata models such that an aggregated metadata model is generated.
3. Analyzing the aggregated metadata model.
4. Identifying (based on results of the analysis) the emerging or service, growing, or shrinking factors of interest.

Alternatively, the personalized Web search results may be further generated based on weighting factors (associated with an importance of said world related factors with respect to the user) received via an assessment interface.

In step 218, a modified software and Web search results process is executed as follows: products and services not selected by the user are identified. Alternatively, products and services associated with real world related factors may be presented to the user and a user selection of a product or service may reinforce a machine learning model such that the selection does not infer that additional products or services are incorrect with respect to not enabling the selection. Additionally, users are able to view products/services not recommended by the machine learning model. Therefore, the user may select a product or service that has not been recommend thereby refining user intent. Therefore, a selection of a product or service that has not been recommend may be used to modify the machine learning model via a reinforcement learning process for improving the machine learning model. In response, the metadata model and modeling software application are modified resulting in a modified metadata model and a modified modeling software application. The modification process is executed based on the products and services not selected by the user, securing the specified product or service, and the entity selected during presentation. Likewise, an additional search request associated with initiating an additional Web search for an additional specified product or service is received from the user and in response, the modified modeling software application is executed with respect to the modified metadata model and additional Web search. Subsequently, modified personalized Web search results are generated and presented to the user. The modified personalized Web search results indicate ranked entities associated with providing the additional specified product or service for the user via a specific group of Internet based commerce Websites.

Figure 3:
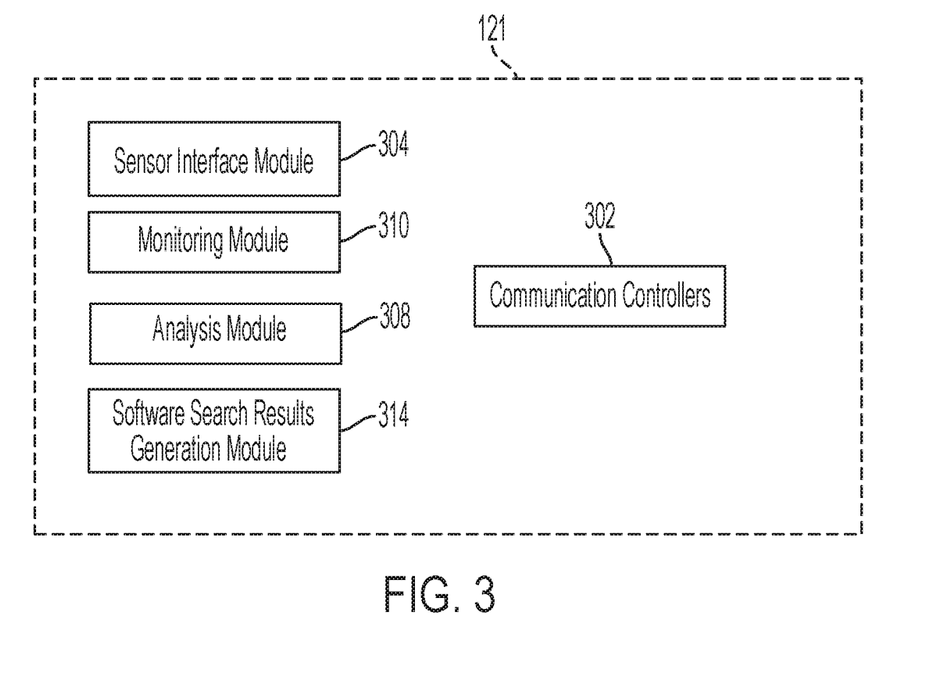
FIG. 3 illustrates an internal structural view of the modeling software/hardware structure and/or the circuitry of FIG. 1, in accordance with embodiments of the present invention.

FIG. 3 illustrates an internal structural view of modeling software/hardware structure 121 (and/or circuitry 127) of FIG. 1, in accordance with embodiments of the present invention. Modeling software/hardware structure 121 includes a sensor interface module 304, a monitoring module 310, an analysis module 308, a software search results generation module 314, and communication controllers 302. Sensor interface module 304 comprises specialized hardware and software for controlling all functions related to sensors 112 of FIG. 1. Monitoring module 310 comprises specialized hardware and software for controlling all functionality related control of all monitoring functionality for implementing the process described with respect to the algorithm of FIG. 2. Analysis 308 comprises specialized hardware and software for controlling all functions related to the analysis steps of FIG. 2. Software search results generation module 314 comprises specialized hardware and software for controlling all functions related to generating personalized search results as described, supra. Communication controllers 302 are enabled for controlling all communications between sensor interface module 304, monitoring module 310, analysis module 308, and software search results generation module 314.

Figure 4:
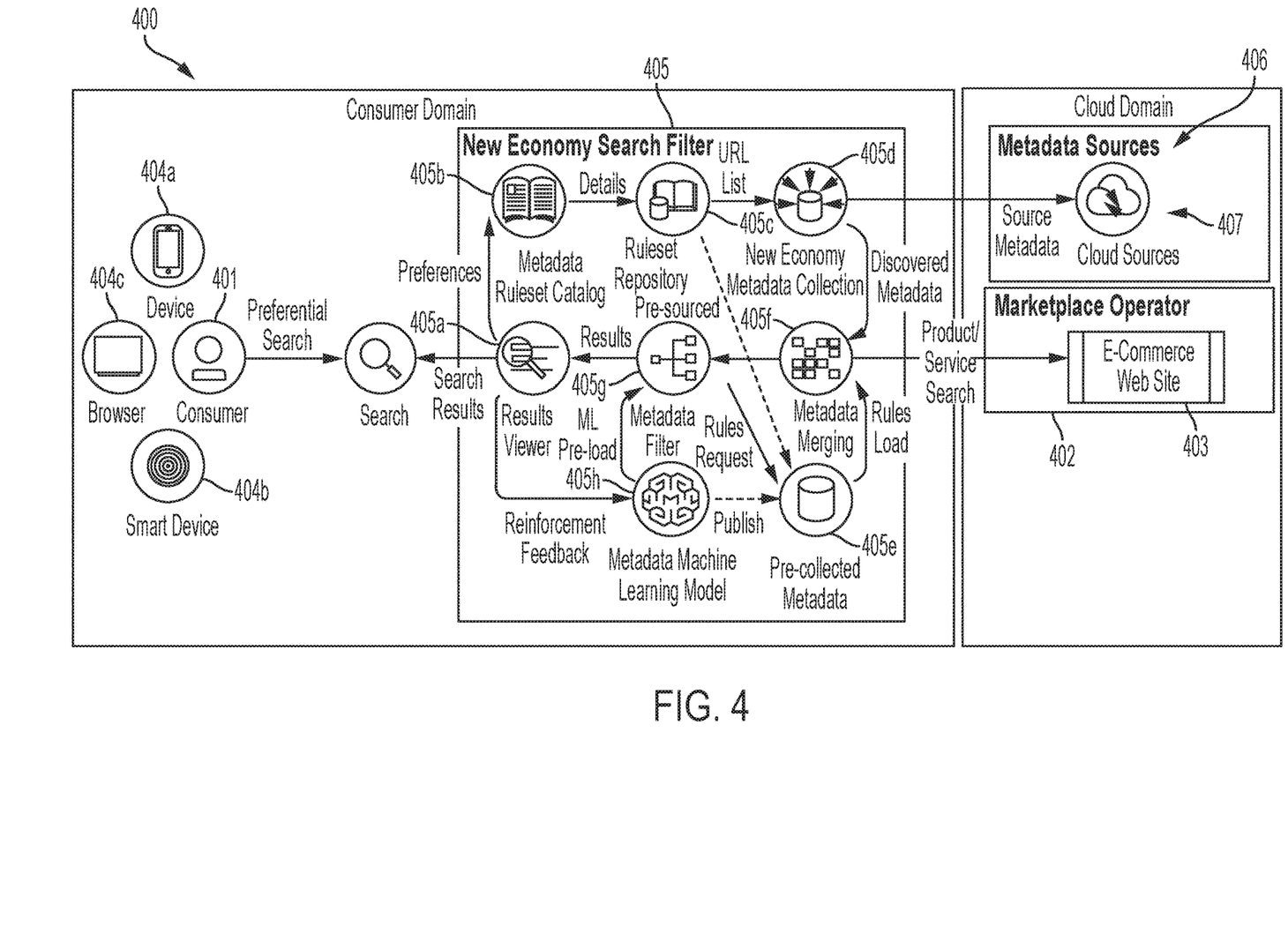
FIG. 4 illustrates an architectural view of an IT system for implementing the algorithm of FIG. 2, in accordance with embodiments of the present invention.

FIG. 4 illustrates an architectural view of an IT system 400 for implementing the algorithm of FIG. 2, in accordance with embodiments of the present invention. IT system 400 comprises a consumer system 401, a merchandiser system 402, an E-commerce Website 403, devices 404*a* . . . 404*c*, a search filter system 405, a data source 406, and a data source 407 (i.e., merchandise supplier metadata). Consumer system 401 comprises a system enabled by a human actor executing a digital commerce experience to search for and purchase desired products and services. Merchandiser system 402 is enabled via individual and teams within a marketplace operator system responsible for delivering a brand experience according to a policy with respect to a digital shopping consumer. E-commerce Website 403 comprises a digital commerce Website for facilitating on-line transactions for products and services. E-commerce Website 403 may be operated via retailers, marketplace operators, etc. Devices 404*a* . . . 404*c* may include, inter alia, a communication device, a Web browser, a smart device, etc. Device capability (for devices 401*a* . . . 401*c*) may be delivered via a service (e.g., a microservice(s)), an application (e.g., a Web application, a mobile application, etc.), a plug-in to a Web browser, a hardware appliance (e.g., a smart device), a merchandising plug-in for Website metadata population, etc. Search filter system 405 comprises a collection of combined capabilities for introducing a preference filter over digital commerce Websites that enable consumers to digitally shop according to associated world related factor attribute preferences. Search filter system 405 provides the following functionality:

1. Packaging of world related factor attributes
2. Capabilities for discovering and setting preferences for world related factor attributes
3. Capabilities for training software for search filter system 405 for refined personal preferences.
4. Service capabilities for merging metadata with respect to a search result.
5. Capabilities for classifying returned search results according to search result preferences.
6. Functionality for selectively viewing results of searches for products and services.

Search filter system 405 comprises a results viewer component 405a, a metadata ruleset catalog component 405b, a ruleset repository 405c, a metadata collector component 405d, a pre-collected metadata component 405e, a metadata merging component 405f, a metadata filter component 405g, and a metadata machine learning model 405h. Results viewer component 405a comprises an interface to actions providing support for key interactions such as, inter alia:

1. Connecting search filter system 405 for enabling a digital commerce ecosystem.
2. Establishing preferences for search filters through discovery of rulesets packages and rules.
3. Forwarding search requests that would typically be enabled via a digital commerce Website.
4. Viewing returned search results including notifications with respect to a presence of result exclusions.
5. Selective viewing of results that would typically be excluded from results via non-compliance with preferred rules.
6. Rating a suitability of a search result item (via means of reinforcement learning) for enhanced alignment with personal preferences.

Metadata ruleset catalog component 405b includes a repository of world related factor ruleset packages registered for discovery and usage by a results viewer capability. Metadata ruleset catalog component 405b additionally includes a glossary description of an associated ruleset package including a ruleset purpose, a description of external sources, a type, examples, etc. Navigation of a metadata ruleset catalogue may be enabled to locate pre-packaged sets of filter rules configured to meet specific world related factor search needs with respect to supply chain search types, bottom line search types, recyclability search types, etc.

Ruleset repository 405c includes a repository of discrete rules used for filtering searches. A rule may include a destination URL combined with qualifications including string searches. Rule may be grouped by one or more packages and may additionally be configured to populate pre-collected metadata capability with search results from prior searches.

Metadata collector component 405d includes a software/hardware engine for interrogating preferential internet resources defined within ruleset repository 405c for collecting world related factor metadata. Returned metadata may be passed to metadata merging capability.

Pre-collected metadata component 405e may include a repository of world related factor data attributes that align with contents of ruleset repository 405c with respect to data attributes pre-collected and stored for faster performance.

Metadata merging component 405f enables functionality for combining to form a single entity of metadata per product or service from multiple streams of metadata such as, inter alia, world related factor metadata, pre-collected metadata, digital commerce web site metadata, etc. Metadata merging component 405f combines digital commerce web site metadata with world related factor retrieved from sources external to the digital commerce web site.

Metadata filter component 405g is configured to tag results of a metadata merging process in accordance with defined search preferences. The tagging process id aligned to present result associated with criteria. The tagging process is associated with personalized reinforced learning managed via metadata machine learning model 405h.

Metadata machine learning model 405h is configured to enable reinforcement training capability for processing a consumer's negatively or positively rated products and services into a machine learning model used to refine an accuracy of metadata filter component 505g based on analysis of previous results that have determined to be acceptable and unacceptable to a consumer.

Data source 406 comprises metadata sources (e.g., internet based) gathered for processing. For example, sources addressing community alignment, sustainability, ethical sourcing, recycling, etc.

Data source 407 comprises supplier metadata generated and supplied by a supplier.

Figure 5:
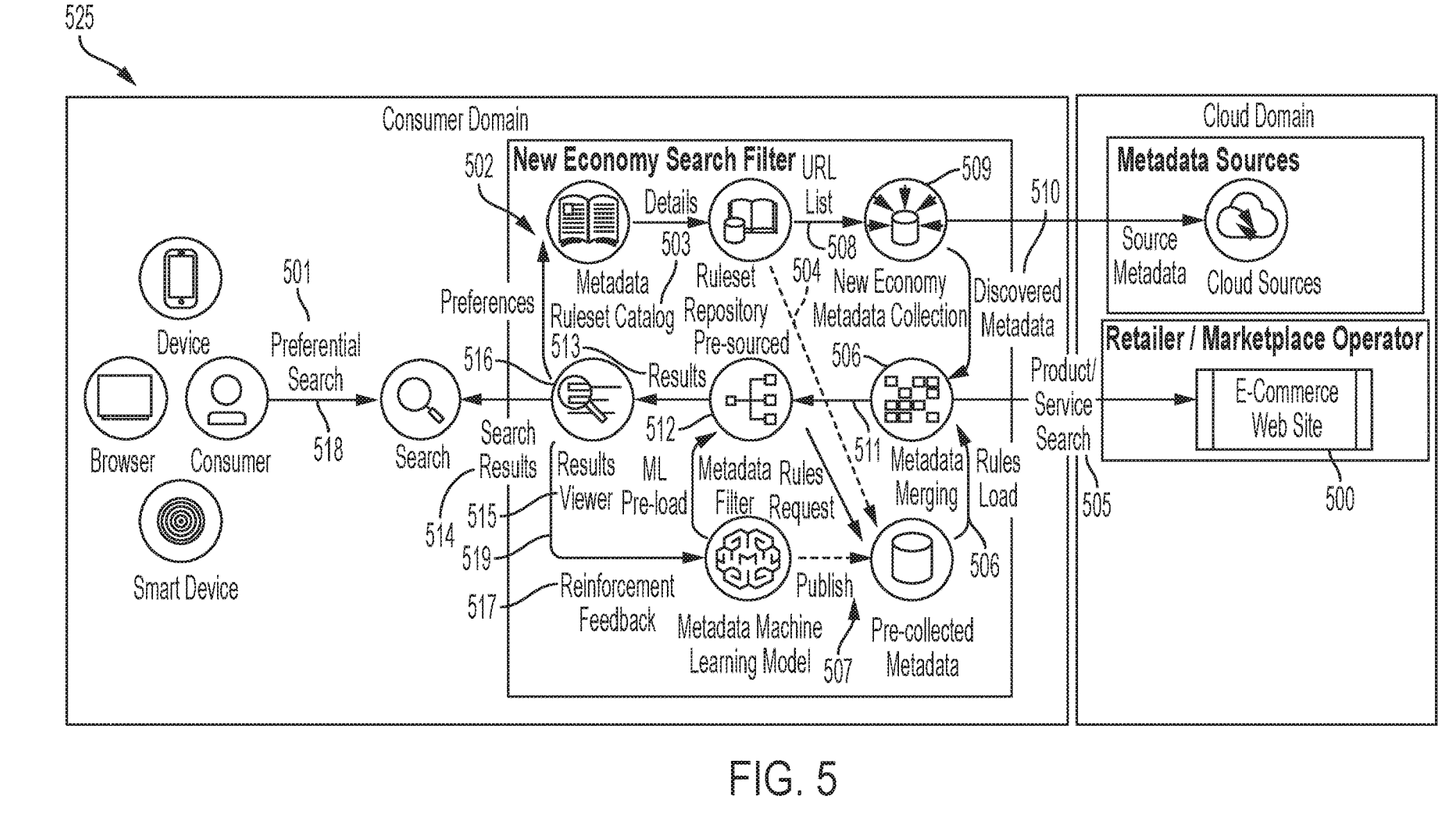
FIG. 5 illustrates an algorithm detailing a process flow enabled by the system of FIG. 4, in accordance with embodiments of the present invention.

FIG. 5 illustrates an algorithm 525 detailing a process flow enabled by system 400 of FIG. 4 for determining an importance of world related factors with respect to a user and generating personalized Web search results for the user based on the determined importance of world related factors of the user, in accordance with embodiments of the present invention. In step 500, a digital commerce Website is populated with product and services metadata. In step 501, the digital commerce Website is connected to a world related factor search filter component. In step 502, a catalogue of world related factor packages is searched and in step 503, world related factor filter preferences are selected. In step 504, the world related factor filter preferences are connected via the world related factor search filter component to digital commerce Website. In step 505, a product/service search is executed with respect to the digital commerce Website. In step 506, results from step 505 are captured (by the world related factor filter component) for digital commerce. In step 507, the world related factor filter component ingests pre-collected metadata. In step 508 a filter service (enabled via the world related factor filter component) initiates connections with additional sources via analysis of filter preferences. In step 509, the filter service initiates discovery searches with respect to additional sources based on filter preferences. In step 510, the filter service receives discovered data. In step 511, the filter service merges digital commerce site data with discovered and pre-collected data. In step 512, the filter service tags and masks returned results (from step 505) that do not match preferences. In step 513, results of step 512 and a notification of exclusions are returned to a results viewer interface. In step 514, search results are presented to a user. In step 515, resultant products or services are rated with respect to a misalignment with preferences. In step 516, excluded results are presented to the user where the user signals interest to explore such products and services. In step 517, the resultant products or services are rated with respect to an alignment with preferences. In step 518, products or services are selected, and a checkout process executed. In step 519, machine learning code associated with the aforementioned process is generated.

Figure 6:
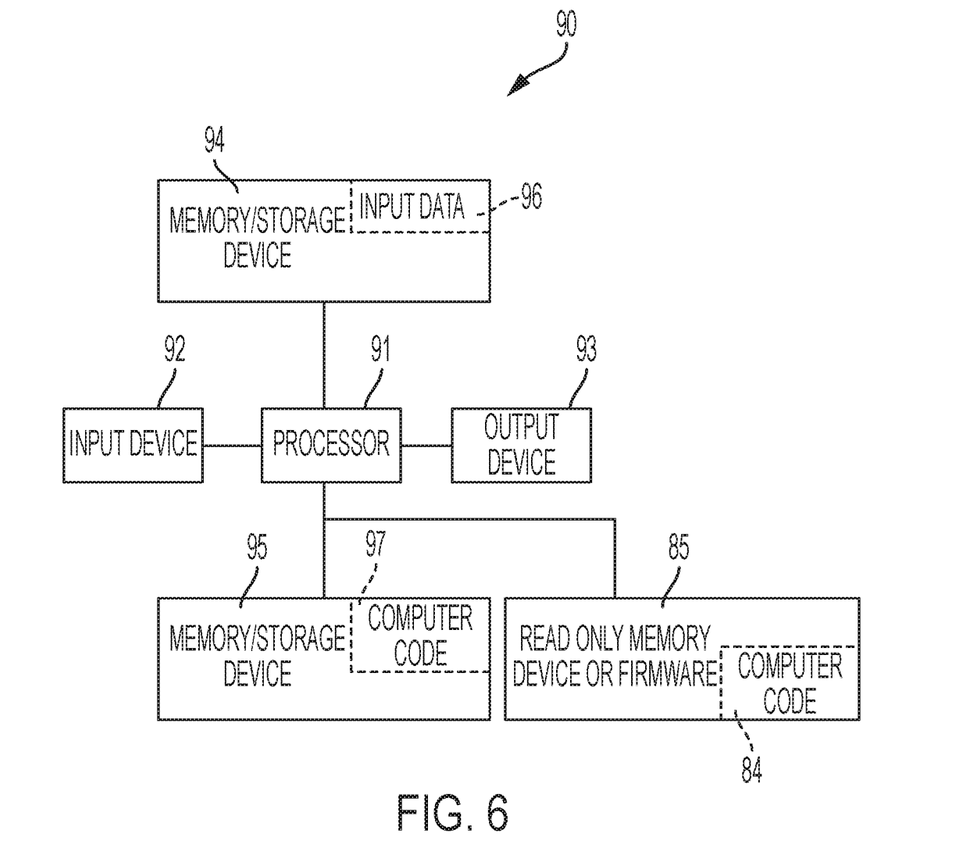
FIG. 6 illustrates a computer system used by the system of FIG. 1 for improving network search technology associated with monitoring Web sources, determining an importance of world related factors with respect to a user, and generating personalized Web search results for the user based on the determined importance of world related factors of the user, in accordance with embodiments of the present invention.

FIG. 6 illustrates a computer system 90 (e.g., server system 139 of FIG. 1) used by or comprised by the system of FIG. 1 for improving network search technology associated with monitoring Web sources, determining an importance of world related factors with respect to a user, and generating personalized Web search results for the user based on the determined importance of world related factors of the user, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithms of FIGS. 2 and 5) for improving network search technology associated with monitoring Web sources, determining an importance of world related factors with respect to a user, and generating personalized Web search results for the user based on the determined importance of world related factors of the user. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIGS. 2 and 5) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve network search technology associated with monitoring Web sources, determining an importance of world related factors with respect to a user, and generating personalized Web search results for the user based on the determined importance of world related factors of the user. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving network search technology associated with monitoring Web sources, determining an importance of world related factors with respect to a user, and generating personalized Web search results for the user based on the determined importance of world related factors of the user.

In another embodiment, the invention provides a business method that performs the process steps of the invention on a subscription, advertising, and/or fee basis. That is, a service supplier, such as a Solution Integrator, could offer to enable a process for improving network search technology associated with monitoring Web sources, determining an importance of world related factors with respect to a user, and generating personalized Web search results for the user based on the determined importance of world related factors of the user. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a configuration of hardware and software, any configuration of hardware and software, as would be known to a person of ordinary skill in the art, may be utilized for the purposes stated supra in conjunction with the computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
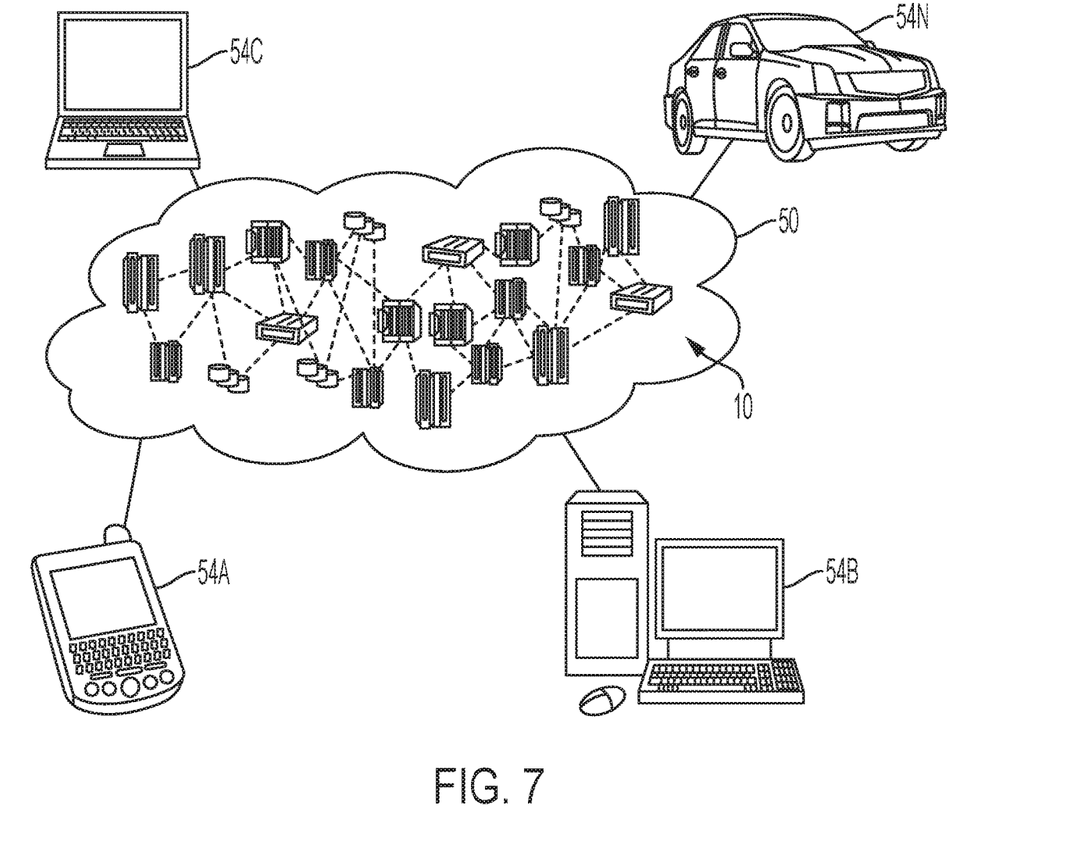
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (or tablet computers, smart speakers, cameras, smart sensors, etc.), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
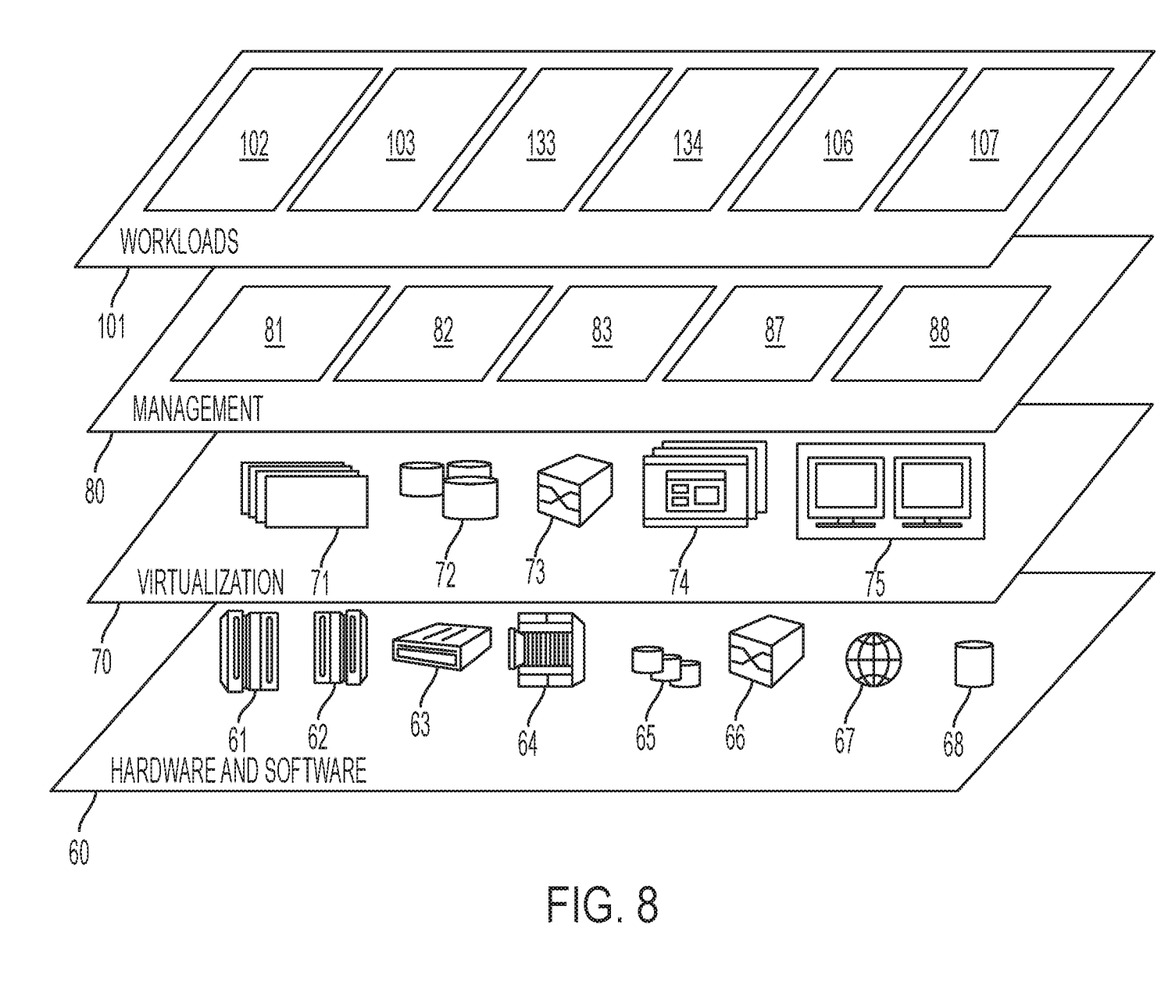
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61 (or quantum computers); RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving network security technology associated with monitoring network usage, ranking and modifying user security questions associated with enabling access to a secure account of a user; and monitoring Web sources, determining an importance of world related factors with respect to a user, and generating personalized Web search results for the user based on the determined importance of world related factors of the user 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A digital search method comprising:
receiving, by a processor of a server hardware device from a user, data indicating an importance of world related factors with respect to said user, wherein said world related factors comprise a product company type, carbon footprint issues associated with manufacturing of products, social media based issues, and community based issues;
generating, by said processor, an interface configured to enable said user to modify search result filtering attributes for said importance with respect to products or services;
analyzing, by said processor via said interface, said data with respect to: Web search results associated with multiple Web searches initiated by said user, social media accounts of said user, and media sources;
generating, by said processor based on results of said analyzing, a metadata model and a modeling software application personalized for said user;
receiving, by said processor from said user, a search request associated with initiating a specified Web search for a specified product or service;
executing, by said processor in response to receiving said search request, said modeling software application with respect to said metadata model and said specified Web search;
generating, by said processor in response to results of said executing, personalized Web search results for said user, wherein said personalized Web search results indicate multiple entities associated with providing said specified product or service for said user via Internet based commerce Websites;
presenting, by said processor to said user via said user interface, said personalized Web search results;
packaging, by said processor in response to said personalized Web search results, profile interest data, of said user, as selectable digital collections being extended for training software associated with specific nuances of said user; and
generating, by said processor based on said selectable digital collections, open source code executable for filtering interests of said user with respect to communities of additional users.

2. The method of claim 1, wherein said generating said personalized Web search results comprises ranking said entities in accordance with a determined importance level of said user with respect to said importance of said world related factors with respect to said user.

3. The method of claim 1, wherein said presenting said personalized Web search results to said user causes said user to select an entity of said multiple entities and initiate a Web retrieval process for securing said specified product or service.

4. The method of claim 3, further comprising:
identifying, by said processor, entities not selected by said user;
modifying, by said processor, said metadata model and said modeling software application resulting in a modified metadata model and a modified modeling software application, wherein said modifying is executed based on: said products and services not selected or rejected by said user, said securing said specified product or service, and said entity selected during said presenting;
receiving, by said processor from said user, an additional search request associated with initiating an additional Web search for an additional specified product or service;
executing, by said processor in response to receiving said additional search request, said modified modeling software application with respect to said modified metadata model and said additional Web search;
generating, by said processor in response to results of said executing said modified modeling software application, modified personalized Web search results for said user, wherein said modified personalized Web search results indicate ranked entities associated with providing said additional specified product or service for said user via a specific group of Internet based commerce Websites; and
presenting, by said processor to said user via said user interface, said modified personalized Web search results.

5. The method of claim 1, wherein said world related factors comprise factors selected from the group consisting of social factors, environmental factors, and physical factors.

6. The method of claim 1, further comprising:
monitoring, by said processor via sensors in response to receiving authorization from said user, an area surrounding said user, wherein said analyzing further comprises additionally analyzing results of said monitoring said area surrounding said user with respect to said data.

7. The method of claim 6, wherein said sensors comprise a video retrieval device, an optical sensor, and an audio retrieval device.

8. The method of claim 1, wherein said specified product or service is selected from the group consisting of an item, a service, a manufacturer, and a merchant.

9. The method of claim 1, further comprising:
retrieving, by said processor, a plurality of metadata models associated with a plurality of users;
aggregating, by said processor, said plurality of metadata models such that an aggregated metadata model is generated;

analyzing, by said processor, said aggregated metadata model; and identifying, by said processor based on results of said analyzing said aggregated metadata model, emerging, growing, or shrinking factor of interest with respect to differing user demographics, wherein said personalized Web search results for said user are further generated based on said emerging, growing, or shrinking factors of interest with respect to differing user demographics.

10. The method of claim 1, further comprising:

presenting, by said processor to said user, an assessment interface; and receiving, by said processor from said user, weighting factors associated with said importance of said world related factors with respect to said user, wherein said personalized Web search results for said user are further generated based on said weighting factors.

11. The method of claim 1, further comprising:

providing at least one support service for at least one of creating, integrating, hosting, maintaining, and deploying computer-readable code in the server hardware device, said code being executed by the processor to implement: said receiving said data, said analyzing, said generating said metadata model, said receiving said search request, said executing, said generating said personalized Web search results, and said presenting.

12. A computer program product, comprising a computer readable hardware storage device storing a computer readable program code, said computer readable program code comprising an algorithm that when executed by a processor of a server hardware device implements a digital search method, said method comprising:

receiving, by said processor from a user, data indicating an importance of world related factors with respect to said user, wherein said world related factors comprise a product company type, carbon footprint issues associated with manufacturing of products, social media based issues, and community based issues;

generating, by said processor, an interface configured to enable said user to modify search result filtering attributes for said importance with respect to products or services;

analyzing, by said processor via said interface, said data with respect to: Web search results associated with multiple Web searches initiated by said user, social media accounts of said user, and media sources;

generating, by said processor based on results of said analyzing, a metadata model and a modeling software application personalized for said user;

receiving, by said processor from said user, a search request associated with initiating a specified Web search for a specified product or service;

executing, by said processor in response to receiving said search request, said modeling software application with respect to said metadata model and said specified Web search;

generating, by said processor in response to results of said executing, personalized Web search results for said user, wherein said personalized Web search results indicate multiple entities associated with providing said specified product or service for said user via Internet based commerce Websites;

presenting, by said processor to said user via said user interface, said personalized Web search results;

packaging, by said processor in response to said personalized Web search results, profile interest data, of said user, as selectable digital collections being extended for training software associated with specific nuances of said user; and generating, by said processor based on said selectable digital collections, open source code executable for filtering interests of said user with respect to communities of additional users.

13. The computer program product of claim 12, wherein said generating said personalized Web search results comprises ranking said entities in accordance with a determined importance level of said user with respect to said importance of said world related factors with respect to said user.

14. The computer program product of claim 12, wherein said presenting said personalized Web search results to said user causes said user to select an entity of said multiple entities and initiate a Web retrieval process for securing said specified product or service.

15. The computer program product of claim 14, wherein said method further comprises:

identifying, by said processor, entities not selected or rejected by said user;

modifying, by said processor, said metadata model and said modeling software application resulting in a modified metadata model and a modified modeling software application, wherein said modifying is executed based on: said products and services not selected or rejected by said user, said securing said specified product or service, and said entity selected during said presenting;

receiving, by said processor from said user, an additional search request associated with initiating an additional Web search for an additional specified product or service;

executing, by said processor in response to receiving said additional search request, said modified modeling software application with respect to said modified metadata model and said additional Web search;

generating, by said processor in response to results of said executing said modified modeling software application, modified personalized Web search results for said user, wherein said modified personalized Web search results indicate ranked entities associated with providing said additional specified product or service for said user via a specific group of Internet based commerce Websites; and presenting, by said processor to said user via said user interface, said modified personalized Web search results.

16. The computer program product of claim 12, wherein said world related factors comprise factors selected from the group consisting of social factors, environmental factors, and physical factors.

17. The computer program product of claim 12, wherein said method further comprises:

monitoring, by said processor via sensors in response to receiving authorization from said user, an area surrounding said user, wherein said analyzing further comprises additionally analyzing results of said monitoring said area surrounding said user with respect to said data.

18. The computer program product of claim 17, wherein said sensors comprise a video retrieval device, an optical sensor, and an audio retrieval device.

19. The computer program product of claim 12, wherein said specified product or service is selected from the group consisting of an item, a service, a manufacturer, and a merchant.

20. A server hardware device comprising a processor coupled to a computer-readable memory unit, said memory unit comprising instructions that when executed by the processor implements a digital search method comprising:

receiving, by said processor from a user, data indicating an importance of world related factors with respect to said user, wherein said world related factors comprise a product company type, carbon footprint issues associated with manufacturing of products, social media based issues, and community based issues;

generating, by said processor, an interface configured to enable said user to modify search result filtering attributes for said importance with respect to products or services;

analyzing, by said processor via said interface, said data with respect to: Web search results associated with multiple Web searches initiated by said user, social media accounts of said user, and media sources;

generating, by said processor based on results of said analyzing, a metadata model and a modeling software application personalized for said user;

receiving, by said processor from said user, a search request associated with initiating a specified Web search for a specified product or service;

executing, by said processor in response to receiving said search request, said modeling software application with respect to said metadata model and said specified Web search;

generating, by said processor in response to results of said executing, personalized Web search results for said user, wherein said personalized Web search results indicate multiple entities associated with providing said specified product or service for said user via Internet based commerce Websites;

presenting, by said processor to said user via said user interface, said personalized Web search results;

packaging, by said processor in response to said personalized Web search results, profile interest data, of said user, as selectable digital collections being extended for training software associated with specific nuances of said user; and generating, by said processor based on said selectable digital collections, open source code executable for filtering interests of said user with respect to communities of additional users.

* * * * *